United States Patent [19]

Sipos et al.

[11] Patent Number: 5,289,845
[45] Date of Patent: Mar. 1, 1994

[54] OILFIELD TUBING REEL AND REEL ASSEMBLY

[75] Inventors: David L. Sipos, Friendswood; Duane M. Kuske, The Woodlands, both of Tex.

[73] Assignee: Bowen Tools, Houston, Tex.

[21] Appl. No.: 974,698

[22] Filed: Nov. 12, 1992

[51] Int. Cl.$^5$ .............................................. A62C 5/00
[52] U.S. Cl. ............................... 137/355.27; 137/355.2
[58] Field of Search ....................... 137/355.26, 355.27, 137/355.17, 355.2

[56] References Cited

U.S. PATENT DOCUMENTS

| | | | |
|---|---|---|---|
| 1,043,647 | 11/1912 | Wagner | 137/355.2 |
| 2,490,353 | 12/1949 | Hannay | 137/355.27 |
| 2,514,862 | 7/1950 | Hannay | 137/355.27 |
| 2,595,655 | 5/1952 | Hannay | 137/355.2 |
| 3,175,574 | 3/1965 | Morford | 137/355.26 |
| 3,313,346 | 4/1967 | Cross | 166/0.5 |
| 3,379,393 | 4/1968 | Pilcher | 242/158.4 |
| 3,614,019 | 10/1971 | Slator et al. | 242/157.1 |
| 3,658,270 | 4/1972 | Slator et al. | 242/54 |
| 3,690,160 | 9/1972 | Slator et al. | 72/160 |
| 4,649,954 | 3/1987 | Dunwoody | 137/355.27 |
| 4,945,938 | 8/1990 | Ponsford et al. | 137/355.2 |

OTHER PUBLICATIONS

M. A. Mullin, S. H. McCarty and M. E., Plante, "Fishing With 1.5- and 1.75-in. Coiled Tubing at Western Prudhoe Bay, Alaska," Sep. 23, 1990, Society of Petroleum Engineers.
CUDD Pressure Control Coiled Tubing, 1982-83 Composite Catalog of Oilfield Equipment and Services, vol. 2, p. 2268.
Baker-Hughes Coiled Tubing Unit, 1982-83 Composite Catalog of Oilfield Equipment and Services, vol. 1, pp. 1180-1181.
Dowell Schlumberger Coiled Tubing Unit, 1986-87 Composite Catalog of Oilfield Equipment and Services, vol. 1, pp. 1630-1631.
Dyer Endless Coiled Tubing Units, 1986-87 Composite Catalog of Oilfield Equipment and Services, vol. 1, pp. 1830-1831.
Bowen Continuous String Coiled Tubing Units, 1986-87 Composite Catalog of Oilfield Equipment and Services, vol. 1, pp. 575-577.
Bowen Coiled Tubing Units, 1982-83 Composite Catalog of Oilfield Equipment and Services, vol. 1, pp. 1349-1351.
Rebound Coiled Tubing Units, 1986-87 Composite Catalog of Oilfield Equipment and Services, vol. 4, p. 5564.
Nowsco Coiled Tubing Units, 1986-87 Composite Catalog of Oilfield Equipment and Services, vol. 3, pp. 5078-5079.
Bowen Coiled Tubing Systems brochure.

*Primary Examiner*—A. Michael Chambers

[57] ABSTRACT

An improved coiled tubing reel and unit utilizing a system of two non-continuous spindles, each having a fixed, spaced apart spindle stub, and associated, spaced apart inner hubs secured within the tubing-supporting outer drum of the reel for rotation of the inner hubs about the fixed spindle stubs. The reel assembly permits rotary fluid and wireline connectors and drive motor to be located within the reel's outer drum, for protection from damage and to provide a more compact reel assembly which minimizes the overall width of the unit while maximizing the useable spool length to increase the amount of coiled tubing.

12 Claims, 3 Drawing Sheets

OILFIELD TUBING REEL AND REEL ASSEMBLY

BACKGROUND OF THE INVENTION

1. Field of the Invention

The present invention relates to an apparatus for retaining, dispensing and retrieving oilfield coiled tubing, more particularly to an improved coiled tubing reel assembly.

2. Background of the Invention

Coiled tubing, as used in the oilfield industry, refers to a generally cylindrical metal or armored tubing having an internal diameter of one half to three and one half inches. The tubing is introduced into the oil or gas well bore through wellhead control equipment to perform various tasks during the exploration, drilling, production and workover life of a well. Coiled tubing is routinely utilized to inject gas or other fluids into the well bore to inflate or activate bridges and packers, to transport electric well logging tools downhole and to perform remedial cementing and clean out operations in the well bore. Coiled tubing has also been used to transport fishing tools to the site of a well bore blockage.

Conventional coiled tubing units typically include a reel assembly for storage and dispensing of the coiled tubing, a portable tubing injector head adapted to be mounted on existing wellhead equipment to permit introduction of the tubing into the well bore, a portable power source, a control console and a crane for handling the various elements of the unit. The reel assembly typically includes a reel base or cage for supporting the reel, a rotating reel for storing and retaining the coiled tubing thereon, a drive motor to rotate the reel, a rotary fluid manifold attached to the reel for the injection of gas or liquids into the coiled tubing, a rotary electrical power connector to permit electrical power to be transferred downhole through the coiled tubing and a powered winding or spooling mechanism to control the dispensing and rewinding of the coiled tubing. The rotary electrical power connector, rotary fluid manifold, drive motor and winding mechanism are conventionally mounted external to the reel and within the confines of the reel base. Conventional coiled tubing units and reel assemblies are exemplified by units of the types disclosed in U.S. Pat. No. 3,614,019 and the patents referenced therein.

The reel assembly, injector head, power source, control console and crane are typically mounted on a single platform for transport to a well site. The reel assembly is generally the largest single component of the coiled tubing unit. The size of the coiled tubing unit platform is limited by various regulations, including Department of Transportation regulations which limit the width and height for standard tractor-trailer truck units. The size of barges or work boats used to transport the coiled tubing unit to an offshore well site may also limit the size of the coiled tubing unit.

A typical, conventional coiled tubing reel R is generally illustrated in FIG. 1. Reel assembly R illustrated in FIG. 1 is typically mounted on a skid S by way of two opposing supporting posts P. A central axle A is mounted for rotation by way of bearing assemblies B, and generally centered on the supporting posts. Secured to the axle A, internal to the posts P, are opposing flanges F and an outer reel hub H which define the space within which coiled tubing CT is retained for transportation to and from the well site in its coiled state.

To rotate the reel for coiling and uncoiling the tubing, a reversible drive motor N is typically secured to the skid as illustrated, with a drive chain D transferring rotation from the motor to the entire reel and axle structure, by way of sprocket BP mounted to the reel flange.

With the central, live axle reel arrangement, the entire tubing reel and its supporting axle turn as the tubing is uncoiled and coiled on the reel. To permit fluid to pass into and out of the coiled tubing, a rotary fluid coupling RC is mounted outside one of the tubing flanges, which is in turn connected to a fluid manifold FL by way of piping connections PI. The axle A includes a fluid passageway FP which is in communication with the coiled tubing CT via fluid tubing FT. As illustrated in FIG. 1, this arrangement requires a complicated configuration of manifold FL and rotary coupling RC connections, all mounted outside the space defined by the opposing flanges F.

In some instances, coiled tubing units are required to provide electrical power to tools mounted on the coiled tubing CT. For this purpose, in the conventional reel R, a rotary electrical connector RE is mounted to the opposite flange F for connection with an external power cable EC and an internal power cable PC. The power cable PC is typically inserted through an electrical passageway EP in the axle A and from there to the coiled tubing CT by way of a cable fitting CF. The power cable PC is initially inserted in the coiled tubing CT when the tubing is wound on reel R.

It will be appreciated that conventional reel R requires the electrical rotary connector RE and the fluid manifold FL and rotary fluid coupling RC and piping assembly PI to be outside the flanges where they are exposed and vulnerable to damage in the field. For this reason, many suppliers of coiled tubing units include a metal cage mounted about the reel and its associated peripherals, which adds to the overall dimension of the unit which, due to overall unit size constraints noted above, further limits the useable size of the coiled tubing reel. In addition, conventional reels do not lend themselves to easily removing a reel from its base assembly for changing out an empty or damaged reel to replace it with a new reel.

It would therefore be desirable to provide a more compact coiled tubing unit to maximize the length of the tubing spool or reel. It would also be desirable to mount the manifold and rotary electrical connector within the perimeter of the coiled tubing reel itself to make them less susceptible to damage and to minimize overall unit width so that more tubing can be mounted on a single tubing reel.

SUMMARY OF THE PRESENT INVENTION

The present invention is directed toward an improved reel and reel assembly for dispensing oilfield coiled tubing.

The reel of the present invention has opposing flanges and an outer drum for supporting the coiled tubing. The drum and flanges are supported by two spindle stub assemblies, each spindle stub assembly including an extended spindle stub which extends past an adjacent reel flange and an inner hub mounted coaxially within the drum for rotation about the spindle stub. The drum is secured to the inner hub, e.g., by a plurality of structural support members. The extended spindle stubs are each releasably secured to a support pedestal. In this manner, the inner hubs, drum and reel flanges, as well as the coiled tubing all can be rotated by a drive motor operatively connected to one of the inner hubs.

In addition, the use of non rotating, disconnected spindle stubs makes the space within the reel available for auxiliary equipment and connections such as rotary fluid and electrical connections. Internal mounting of this equipment protects it from damage and makes the reel unit more compact providing more reel length per overall unit width.

Another feature of the invention is the provision of a compact motor mounting arrangement that permits the motor to be released from driving engagement with the driven inner hub of the reel without removing it from its support pedestal mounting so that the reel can be easily and quickly changed out.

BRIEF DESCRIPTION OF THE DRAWINGS

A better understanding of the invention can be obtained when the following detailed description of a preferred embodiment is considered in conjunction with the following drawings, in which.

DETAILED DESCRIPTION OF THE PREFERRED EMBODIMENT

Figure 1:
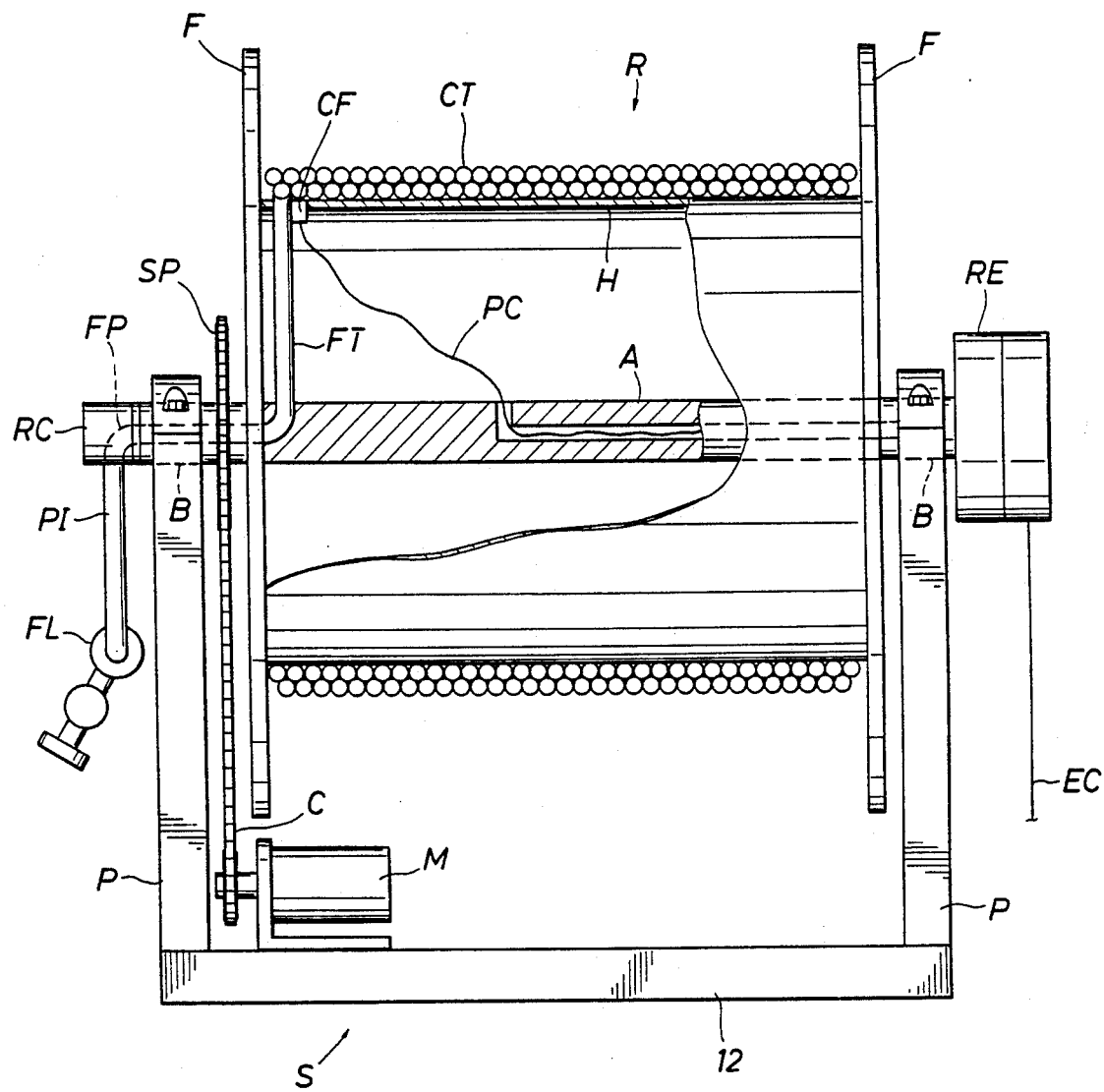
FIG. 1 is a partial cross sectional front view illustrating a typical prior art reel assembly.
Figure 2:
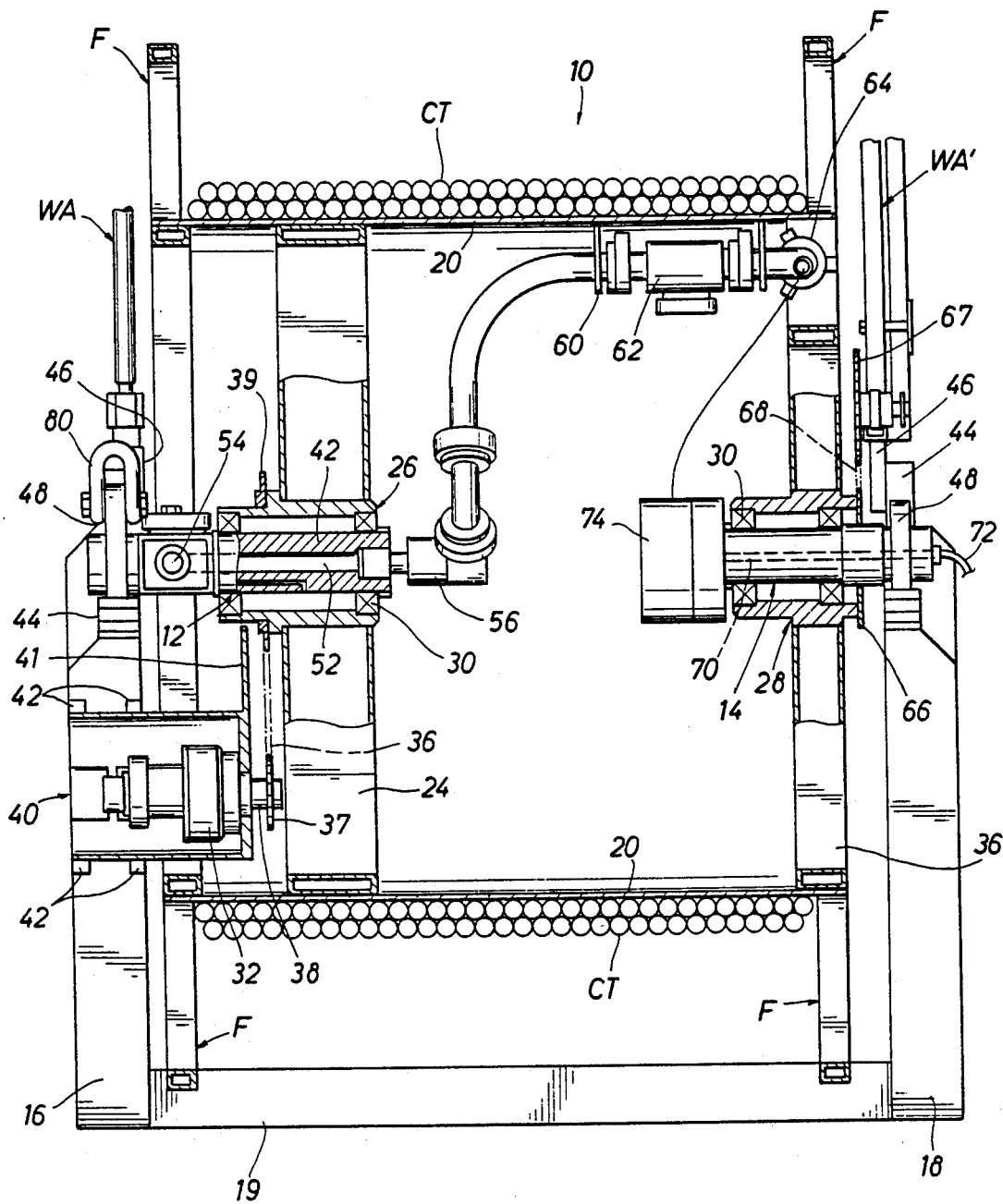
FIG. 2 is a side, cross sectional view of a tubing reel assembly in accordance with the present invention.
Figure 3:
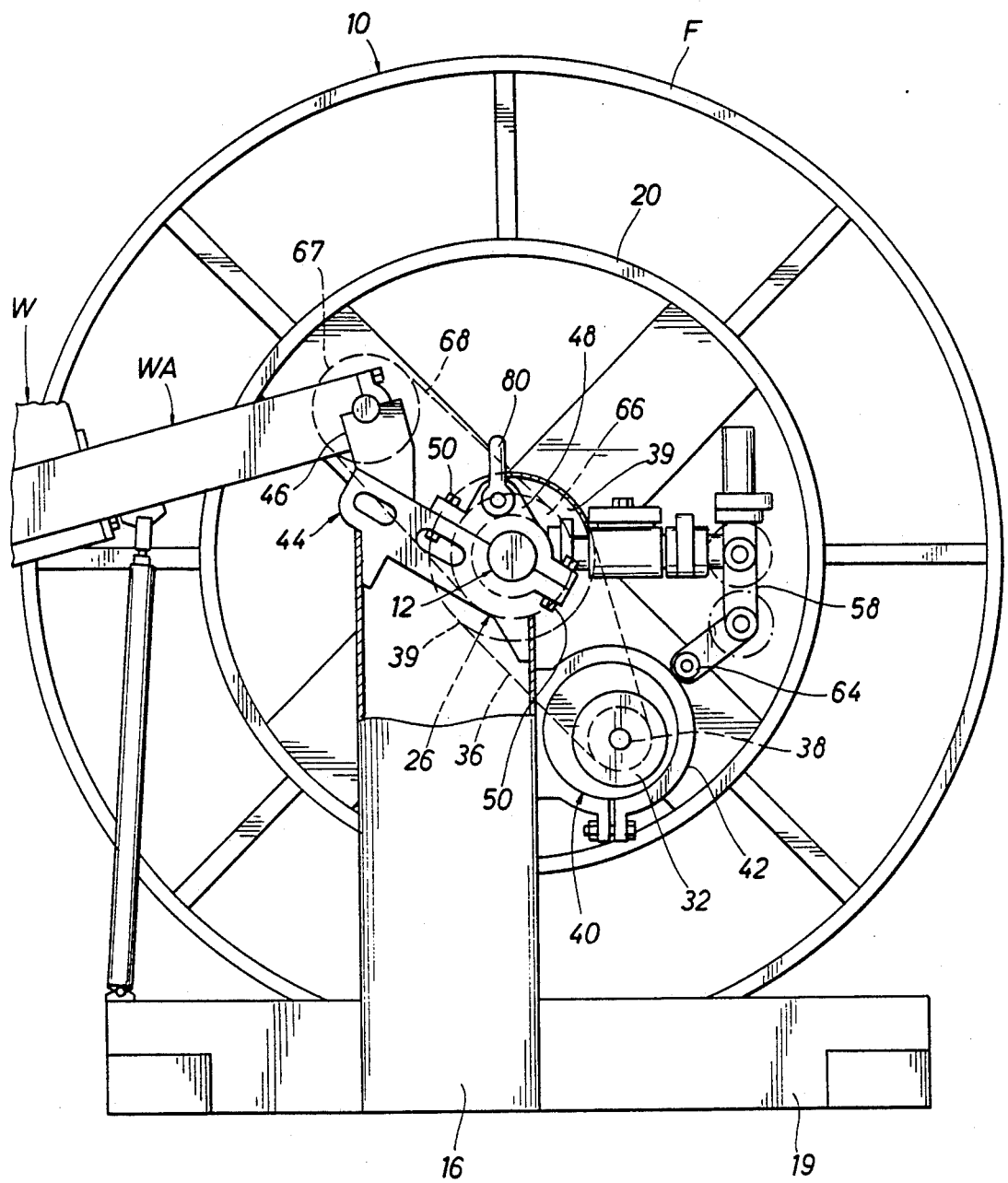
FIG. 3 is an end view in partial cross section of the reel of FIG. 2.

A preferred embodiment of the reel assembly of the present invention, utilizing separate, spaced spindle stubs for reel support, is shown in FIGS. 2 and 3. FIG. 2 is a side view of reel 10, showing both fluid passing spindle stub 12 for servicing fluid connections to the coiled tubing CT, and opposing spindle stub 14, which is adapted to carry electrical connections for servicing wireline connections to the coiled tubing CT, each stub being mounted on its respective supporting pedestal 16 and 18. FIG. 3 is an end view of the reel 10, showing the fluid passing spindle stub 12 mounted on its supporting pedestal 16, and also showing its off-center, releasable mounting, its fluid manifold, and reversible drive motor mounted on the pedestal for rotating the reel assembly to coil and/or dispense the tubing.

With reference to FIGS. 2 and 3, the reel 10 has opposing flanges F for retaining the coiled tubing CT on outer hub or drum 20. Mounted within the drum 20, by way of a plurality of radial struts such as struts 22 and 24, is a first inner hub assembly 26 for rotation of the reel about the fluid passing spindle stub 12 and a second inner hub assembly 28 for rotation of the reel about the opposing spindle stub 14. Each hub assembly is provided with suitable bearing means 30.

Reversible drive motor 32 is conveniently mounted within the perimeter of the drum 20 on the supporting pedestal 16 for driving connection with the first inner hub assembly 26, e.g. by way of drive chain 36 between drive sprocket 37, mounted to drive shaft 38, and driven sprocket 39 mounted to outside of the inner hub assembly 26. For safety, a chain guard 41 is provided between the flange F and the drive sprocket 37.

As best shown in FIG. 3, the pedestal 16 is provided with a motor housing 40 which functions to releasably secure the motor 32 to the pedestal 16, e.g., by way of associated housing clamps 42. In particular, the internal end wall of the housing 40 includes an eccentric hole sized to secure the motor 32 within the housing 40, in an off-center position. With this design, releasing the clamps 42 permits the housing 40 to be rotated to move the motor drive shaft 38 toward it chain 36 to relieve the chain tension to remove it from its sprockets. This then permits the housing 40 to be moved from its driving position (as shown in FIG. 2) to a non-driving position (to the left in FIG. 2) where the end wall of the housing 40, as well as the motor drive shaft 38 and drive gear 37, are outside of the flange F, but the housing 40, with the motor 32 still mounted inside, remains supported by the pedestal 16. This makes the changing out of the reel a very simple procedure, as more fully discussed below.

Turning now to the structure for mounting the fixed spindles to their pedestals, in the illustrated embodiment, the fluid passing spindle stub 12 is mounted to one side of its support pedestal 16, as best shown in FIG. 3. This makes room within the perimeter of the drum 20 for mounting the spindle stub 12 as well as the motor housing 40. Although any type of material or structure could be used as supporting pedestals for the reel, as practiced the pedestals 16 and 18 were each lengths of 20 inch × 8 inch rectangular tubing, as were the basic skid structural elements, such as skid base 19. The top of the rectangular pedestal 16 was angled, and a spindle cradle 44, shaped to fit securely within the angled tubing end, was welded in place atop the pedestal 16. One side of the cradle 44 was shaped to provide a convenient means for mounting a conventional level wind assembly W, for example by way of bracket 46. A spindle clamp 48, welded to the spindle 12, was provided to mate with the spindle cradle 44 to surround and releasably secure the end of the spindle 12 atop the pedestal 16, e.g. by way of bolts 50. With this arrangement, the one arm of the level wind WA can be conveniently mounted to the spindle cradle 44 so that it is also supported by the pedestal 16.

To provide for feeding fluid into the coiled tubing CT, the spindle 12 includes a fluid passageway 52 therethrough, with suitable external fittings for connection with a fluid source, such as the injection port 54 shown in FIG. 2. The internal fluid fittings are greatly simplified by the non rotating, fluid passing spindle 12, and the vulnerable fluid connectors can all be located within the protective confines of the flanges P and the drum 20. For example, as shown in FIG. 2, rotary fluid connector 56 can be mounted to the internal end of the fluid passing spindle 12, which is in turned connected to manifold 58. The remaining piping to the coiled tubing can be made in any suitable manner, and can be conveniently supported by suitable pipe hangers, such as the hangers 60 mounted to the interior of the drum 20, surrounding the valve 62.

With the fluid connections provided by way of the first spindle stub 12, the second spindle stub 14 can be conveniently provided with the means for making electrical connections to use wireline devices with the coiled tubing mounted on the reel. In particular, turning now to the second spindle stub 14, and its associated inner hub assembly 28, the assembly 28 also includes bearing means 30 for rotation of the reel 10 about the fixed or dead spindles 12 and 14, driven by the motor, chain and sprocket assembly on the opposing assembly 20. The spindle stub 14 is releasably mounted atop its supporting pedestal 18, for example, by way of a second spindle cradle 44, and spindle clamp 48 secured to the spindle stub 14, the same as those discussed above. The second level wind arm WA' can also be mounted to the bracket 46 in the manner discussed above for the first level wind arm WA.

Instead of the sprocket for the motor drive chain, this end of the reel assembly, and in particular the second spindle stub assembly 28, can be used to mount sprocket 66 for connection with level wind sprocket 67 by way of the level wind chain 68.

The spindle stub 14 is conveniently provided with a passageway 70 for passing an electrical connection 72 to rotary electrical connector 74, which can be conveniently mounted to the spindle stub 14, internally of the flanges F, the drum 20, and the supporting pedestal 18. Wire connection can then be made to the coiled tubing CT in a conventional manner, but within the drum 20. Thus the rotary electrical connector 74 needed for using the coiled tubing with wireline devices, can be mounted within the reel 10 where it is protected from damage and does not add to the overall width of the reel assembly.

As can now be appreciated, the fixed, spaced, spindle stub structure of the reel of the present invention, in addition to being more compact in width than prior devices, and providing protection for fluid and rotary connections, also provides a reel assembly that can be easily removed and replaced with another similar reel assembly, either to replace damaged tubing or reel or to add length to the installed coiled tubing.

To change out the reel 10, the housing clamps 42 (FIG. 3) are loosened, permitting the housing 40 to be rotated sufficiently to disengage its drive chain 36 from drive sprocket 37 and driven sprocket 39. The housing 40 is then moved outboard of the flange F so that the motor assembly clears the reel 10. The cradle clamp bolts 50 are removed from the spindle clamps 48 freeing both of the spindles 12 and 14, and the master link of the level wind chain 68 is removed to permit the chain 68 to be removed from the level wind sprockets 66 and 67. The external electrical connection and the fluid supply hose, not shown, are then disconnected from the electrical connection 72 and injection port 54, respectively. Lifting equipment, such as chains, belts, etc. are attached to shackles 80 mounted on the spindle clamps 48 which are secured in turn to spindle stubs 12 and 14. The reel 10 may then be readily lifted from the cradles 44 utilizing a crane or other lifting means.

Installation of a new reel 10 in the illustrated embodiment requires looping the drive chain 36 about the driven sprocket 39 on the new reel and lowering the reel into the cradles 44. The spindle stubs 12 and 14 are then secured in the cradles 44 utilizing the spindle clamps 48 and clamp bolts 50. The level wind chain 68 is then reinstalled about its sprockets 66 and 67. The motor 32 and its housing 40 are moved inboard of flange F and the housing 40 rotated to re-tension the chain 36 into driving engagement with the first inner hub assembly 26. The motor housing clamps 42 are then tightened to re-secure the motor housing 40, and external fluid and electrical connections made to put the new reel in condition for use.

With this manner of changing out a reel, the rotary fluid connector, and manifold, and the rotary electrical connector can all stay within the changed out reel so that a new reel having appropriate connections can be mounted back onto the skid mounted pedestals. Alternatively, these rotary connections can be disconnected from the mounted reel and reused on the replacement reel, if desired.

As can now be appreciated, although the invention has been described with reference to a particular embodiment, various modifications of its mechanical components, and arrangement of parts can be made without departing from the spirit of the invention, the scope of which is defined by the following claims.

What is claimed is:

1. A coiled tubing reel and associated support structure apparatus comprising:

a reel for mounting and retaining coiled tubing, said reel including
  an outer hub for mounting coiled tubing, said outer hub having an opening therethrough for passing fluid and electrical connections to the interior of coiled tubing mounted thereon;
  a pair of opposing flanges mounted about the outer hub for retaining coiled tubing on said outer hub;
  a pair of spaced apart, axially aligned, inner hubs secured within said outer hub in spaced, coaxial relation to said outer hub, each inner hub sized to contain a middle portion of a spindle stub;
  a spindle stub mounted within each of said inner hubs, each stub having an outer end, middle and inner end portion;
  bearings mounted within each of said inner hubs for rotation of each of said inner hubs about said middle portion of each spindle stub;
a support structure for rotatably supporting said coiled tubing reel including
  a base;
  a first support pedestal supported by said base;
  a first spindle stub clamp for releasably securing the outer end portion of the first one of said spindle stubs in a fixed position atop said first pedestal;
  a second support pedestal supported by said base, in spaced relation to said first support pedestal;
  a second spindle stub clamp for releasably securing the outer end portion of the second one of said spindle stubs atop said second pedestal such that, when secured to their respective pedestals by way of their respective spindle stub clamps, the first and second spindle stubs are axially aligned with one another; wherein
  said first spindle stub includes a fluid passageway therethrough and the outer end of said first stub is adapted to connect said passageway with a fluid source and the inner end of said first stub is adapted for attachment of a rotary fluid connector within the space between said inner and outer hubs to provide a rotatable fluid connecting passageway between said stationary fluid passageway and said outer hub opening.

2. The apparatus of claim 1 wherein said first support pedestal is adapted to receive said spindle stub clamp in a position away from the center of said first support pedestal and further comprising:

a motor housing clamp adapted to be mounted to said first support pedestal for securing a motor drive mechanism for rotating said inner hubs about said spindle stubs such that a motor housing is moveable from a first operating position within the space defined by said inner hubs, said outer hub and said flange adjacent said first pedestal, and a second non-operating position outside of said flange adjacent said pedestal.

3. The apparatus of claim 2 wherein said first spindle stub clamp further includes a clamp for removably mounting a levelwind apparatus.

4. The apparatus of claim 1 wherein each of said first and second spindle stub clamps includes a first portion mounted on the pedestal having a notch adjacent one end for receiving the outer ends of the spindle stubs and a second mating portion for securing the stub within the notch.

5. The apparatus of claim 1 wherein the inner hubs are mounted within the outer hub by way of a plurality of spaced struts.

6. The apparatus of claim 1 further comprising hangars mounted to said outer hub for supporting fluid connections between said rotary fluid connector and said outer hub opening.

7. A coiled tubing reel and associated support structure comprising:
   a reel for mounting and retaining coiled tubing, said reel including
      an outer hub for mounting coiled tubing, having an opening therethrough for passing fluid and electrical connections to the interior of coiled tubing mounted thereon;
      a pair of opposing flanges mounted about the outer hub for maintaining coiled tubing on said outer hub;
      a pair of spaced apart, axially aligned, inner hubs secured within said outer hub in spaced, coaxial relation to said outer hub, each sized to contain a middle portion of a spindle stub;
      a spindle stub mounted within each of said inner hubs, each still having an outer, middle and inner end portion;
      bearings mounted within each of said inner hubs for rotation of each of said inner hubs about said middle portion of each spindle stub;
   a support structure for rotatably supporting said coiled tubing reel including
      a base;
      a first support pedestal supported by said base;
      a first spindle stub clamp for releasably securing the outer end portion of the first one of said spindle stubs atop said first pedestal;
      a second support pedestal supported by said base, in spaced relation to said first support pedestal;
      a second spindle stub clamp for releasably securing the outer end portion of the second one of said spindle stubs atop said second pedestal such that, when secured to their respective pedestals by way of their respective spindle stub clamps, the first and second spindle stubs are axially aligned with one another; wherein
   said first spindle stub includes a fluid passageway therethrough and the outer end of said first stub is adapted to connect said passageway with a fluid source and the inner end of said first stub is adapted for attachment of a rotary fluid connector within the space between said inner and outer hubs to provide a rotatable fluid connecting passageway between said stationary fluid passageway and said outer hub opening; and
   said second spindle stub includes a passageway for containing electrical conduit and the inner end of said second spindle stub is adapted for attachment of a rotary electrical connector within the space between said inner and outer hubs to provide a rotatable electrical connection between said stationary electrical passageway and said outer hub opening.

8. The apparatus of claim 7 wherein said first support pedestal is adapted to receive said spindle stub clamp in a position away from the center of said first support pedestal and further comprising:
   a motor housing clamp adapted to be mounted to said first support pedestal for securing a motor drive mechanism for rotating said inner hubs about said spindle stubs such that a motor housing is moveable from a first operating position within the space defined by said inner hubs, said outer hub and said flange adjacent said first pedestal, and a second non-operating position outside of said flange adjacent said pedestal.

9. The apparatus of claim 8 wherein said first spindle stub clamp further includes a clamp for removably mounting a levelwind apparatus.

10. The apparatus of claim 7 wherein each of said first and second spindle stub clamps includes a first portion mounted on the pedestal having a notch adjacent one end for receiving the outer ends of the spindle stubs and a second mating portion for securing the stub within the notch.

11. The apparatus of claim 7 wherein the inner hubs are mounted within the outer hub by way of a plurality of spaced struts.

12. The apparatus of claim 7 further comprising hangars mounted to said outer hub for supporting fluid connections between said rotary fluid connector and said outer hub opening.

* * * * *